United States Patent
Jassim et al.

(10) Patent No.: US 11,773,996 B1
(45) Date of Patent: *Oct. 3, 2023

(54) HOLLOW STEM RELIEF VALVE

(71) Applicant: Prince Mohammad Bin Fahd University, Dhahran (SA)

(72) Inventors: Esam Jassim, Dhahran (SA); Abdullah Alhamdan, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,925

(22) Filed: Jan. 30, 2023

Related U.S. Application Data (63) Continuation of application No. 17/897,858, filed on Aug. 29, 2022, now Pat. No. 11,614,176.

(51) Int. Cl.
*F16K 17/04* (2006.01)
*F16K 17/10* (2006.01)
*F16K 17/06* (2006.01)

(52) U.S. Cl.
CPC ...... *F16K 17/0433* (2013.01); *F16K 17/0413* (2013.01); *F16K 17/06* (2013.01); *F16K 17/10* (2013.01)

(58) Field of Classification Search
CPC .. F16K 17/0433; F16K 17/0413; F16K 17/06; F16K 17/10; F16K 47/026; F16K 47/023; F16K 47/01; F16K 47/02; F16K 47/00
See application file for complete search history.

(56) References Cited

U.S. PATENT DOCUMENTS

| | | | | |
|---|---|---|---|---|
| 2,821,208 A | * | 1/1958 | Farris | F16K 17/08 137/478 |
| 3,610,276 A | * | 10/1971 | Seelman | F16K 17/0433 137/469 |
| 3,854,494 A | * | 12/1974 | Zahorsky | F16K 17/0433 137/472 |
| 4,091,838 A | * | 5/1978 | Dowty | E21D 15/512 267/64.13 |

(Continued)

FOREIGN PATENT DOCUMENTS

| | | |
|---|---|---|
| EP | 3 021 017 A1 | 5/2016 |
| KR | 10-2010-0013392 | 2/2010 |
| KR | 10-2018-0027879 | 3/2018 |

*Primary Examiner* — Jessica Cahill
(74) *Attorney, Agent, or Firm* — Oblon, McClelland, Maier & Neustadt, L.L.P.

(57) ABSTRACT

A relief valve device having a spring, a valve bonnet, a valve stem, a disc holder, a valve disc, a huddling chamber, a blowdown ring, and a nozzle. In the valve device, the valve disc is positioned above the nozzle; the spring is disposed in the valve bonnet; the spring surrounds the valve stem such that a longitudinal axis of the spring and a longitudinal axis of the valve stem are coaxial; the disc holder surrounds an outer periphery of the valve disc and is adjacent and in direct contact with a surface of the valve disc around an entire perimeter of the valve disc; the blowdown ring is disposed at a top section of the nozzle; a bottom section of the nozzle is connected to a bottom surface of a valve body and the top section of the nozzle is connected to the valve disc; and the disc holder is filled with oil.

10 Claims, 3 Drawing Sheets

(56) References Cited

U.S. PATENT DOCUMENTS

| | | | | |
|---|---|---|---|---|
| 4,130,130 | A | * | 12/1978 | Stewart .............. F16K 17/0433 |
| | | | | 137/478 |
| 4,257,453 | A | * | 3/1981 | Kohnke ............. A61M 16/208 |
| | | | | 137/514.3 |
| 4,401,264 | A | | 8/1983 | Williams |
| 4,531,542 | A | * | 7/1985 | Looney .................. F16K 47/00 |
| | | | | 137/539.5 |
| 4,858,642 | A | | 8/1989 | Fain, Jr. |
| 5,261,450 | A | | 11/1993 | Betts |
| 8,413,955 | B1 | * | 4/2013 | Rooney .................. F16K 1/465 |
| | | | | 251/332 |
| 8,607,818 | B2 | | 12/2013 | Monroe |
| 9,435,448 | B2 | | 9/2016 | Matsuo |
| 11,098,811 | B2 | | 8/2021 | Meshaikhis et al. |
| 2022/0178456 | A1 | | 6/2022 | Fujiwara |

\* cited by examiner

HOLLOW STEM RELIEF VALVE

CROSS-REFERENCE TO RELATED APPLICATIONS

The present application is a Continuation of U.S. application Ser. No. 17/897,858, now allowed, having a filing date of Aug. 29, 2022.

BACKGROUND

Technical Field

The present disclosure is directed to pressure relief valves; and more particularly to a pressure relief valve with improved stability during release of excessive pressure.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Pressure relief valves (also known as safety valves) are used in many systems to relieve excessive pressure, for instance in many industrial applications to prevent plant operating systems from reaching dangerously high pressures. Such valves include a nozzle and a valve seat which is normally closed by a valve disc slidably disposed in a body of the valve (valve body). The valve disc typically is biased in a closed position against the valve seat by a spring (like a compression spring). Generally, the pressure relief valve is configured so that the lower surface of the nozzle receives the pressure of the gas or the steam tank from a lower inlet portion of the valve body so that the pressure is transmitted through the nozzle. The nozzle is in fluid communication with a pressurized medium in operative connection, and then is closed in the closed position of the pressure relief valve.

With the valve in the closed position, when the pressure in the nozzle exceeds a predefined set value, the valve disc "pops" open and places the nozzle in fluid communication with an exhaust port in the valve body, thus releasing the excessive pressure therefrom. Further, when the pressure in the nozzle decreases by a specified incremental amount, termed the blowdown differential or simply "blowdown" for the valve, the valve disc is again seated on the valve seat to dispose the valve back in its closed position.

One of the major issues with conventional pressure relief valves is the instability during releasing excessive pressure. In particular, the release of the excessive pressure may cause vibrations in the valve body of the pressure relief valve. These vibrations may result in mechanical waves that propagate through the valve body and the components arranged therein, and especially the valve disc which is directly exposed to excessive pressure. This, in turn, could displace the valve disc, thus affecting proper seating of the valve disc with respect to the nozzle, causing shuttering to the disc. Improper seating could result in a loss (leakage) of pressure from the valve body even in its closed position, which is undesirable. For example, in petrochemical industry with high pressure hydrocarbon gas systems, the leakage of the gases may be harmful in many cases, and may need to be burned in a flare causing financial loss as well as excessive pollution.

Some techniques have been proposed in the art to address this problem and improve the stability of pressure relief valves. For example, U.S. Pat. No. 5,261,450A describes a pressure relief vent for a tank or vessel to relieve a positive pressure difference between the interior and the exterior of the tank or vessel through an opening in such a manner that a steady rise in tank pressure above a set pressure will be relieved, but a transient, dynamic surge of pressure above the set pressure, such as a collision, an impact, or the like, will not cause the relief vent to open and allow the leakage of product. U.S. Pat. No. 4,858,642A provides a pressure operated relief valve comprising compressible shock absorber means interposed between the disc and disc holder, wherein the shock absorber functions to lessen the shock forces involved when the valve disc impacts upon valve seat at closing. KR Patent Publication No. 20100013392A provides a spring-activated safety valve to prevent a chattering effect when opening/closing a valve disc and to reduce the lifting impact of the valve disc, in which a disc holder is attached to the top of a disc, a damping chamber is provided by forming a space between the disc guides and guide the ascent and descent of the disk holder.

Each of the aforementioned references suffers from one or more drawbacks hindering their adoption. None of the references provides proper dampening of the valve disc due to the release of the excessive pressure, especially dampening the vibrations in the valve body of the pressure relief valve to prevent generation of the mechanical waves therein. Moreover, the proposed designs in the cited references may require major modifications in the design of the pressure relief valve and/or may compromise the working thereof.

It is an object of the present disclosure to provide a design for the relief valve device to dampen the vibrations due to sudden pop action of the valve disc while releasing the excessive pressure in order to prevent displacement of the valve disc with respect to the nozzle in the valve body, and further to make the valve disc to be faster and properly seated back on the nozzle when the excessive pressure has been released.

SUMMARY

In an exemplary embodiment, a relief valve device is provided. The relief valve device comprises a spring, a valve bonnet, a valve stem, a disc holder, a valve disc, a blowdown ring, and a nozzle. In the relief valve device, the valve disc is positioned above the nozzle. Further, the spring is disposed in the valve bonnet. Further, the spring surrounds the valve stem such that a longitudinal axis of the spring and a longitudinal axis of the valve stem are coaxial. Further, the disc holder surrounds an outer periphery of the valve disc and is adjacent and in direct contact with a surface of the valve disc around an entire perimeter of the valve disc. Further, the blowdown ring is disposed at a top section of the nozzle. Further, a bottom section of the nozzle is connected to a bottom surface of a valve body and the top section of the nozzle is connected to the valve disc. Furthermore, the disc holder is filled with oil. Herein, the relief valve device is configured such that flow through the nozzle is prevented when a first pressure at an inlet of the nozzle is below a predetermined force of the spring, and when the first pressure exceeds the predetermined force of the spring, the valve stem is moved linearly through an axis of the spring to displace the valve disc from sitting atop the nozzle and permit flow through the nozzle.

In one or more exemplary embodiments, the disc holder has a cylindrical stem section. In one or more exemplary embodiments, a diameter of the cylindrical stem section is from 0.6 to 0.8 times a length of the cylindrical base. In one or more exemplary embodiments, the oil is present in the cylindrical stem section of the disc holder, and the cylindrical stem is hollow along from 50% to 90% of an entire length of the cylindrical stem section.

In one or more exemplary embodiments, the disc holder has a cylindrical base. In one or more exemplary embodiments, the cylindrical base sits atop the valve disc.

In one or more exemplary embodiments, the disc holder is made of a metal.

In one or more exemplary embodiments, the disc holder, the blowdown ring, and an outer wall of the nozzle define the huddling chamber.

In one or more exemplary embodiments, the device comprises a process zone valve (PZV). In one or more exemplary embodiments, the PZV directs the oil to flow through the disc holder.

In one or more exemplary embodiments, the device further comprises a pressure adjusting screw configured above a top surface of the valve bonnet. In one or more exemplary embodiments, the pressure adjusting screw is configured to control the predetermined force of the spring.

In one or more exemplary embodiments, the valve stem is fluidically connected to the disc holder.

In one or more exemplary embodiments, the disc holder has a hollow cylindrical stem section and a hollow base portion. In one or more exemplary embodiments, the hollow cylindrical stem section and the hollow base portion define a continuous space. In one or more exemplary embodiments, both the hollow cylindrical stem section and the hollow base section are filled with oil.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a relief valve device with a design to reduce instability of a valve disc therein, due to vibrations during release of excessive pressure therefrom, which may otherwise affect placement setting (reseating) of the valve disc with respect to a nozzle in the relief valve device and may, in turn, lead to pressure loss (leakage) during its operation. In particular, the present disclosure provides a relief valve having a valve disc supported by a disc holder having a hollow stem portion which is preferably at least partially filled with oil in order to dampen the effect of the vibrations when the relief valve is opened during an excessive pressure event.

Figure 1:
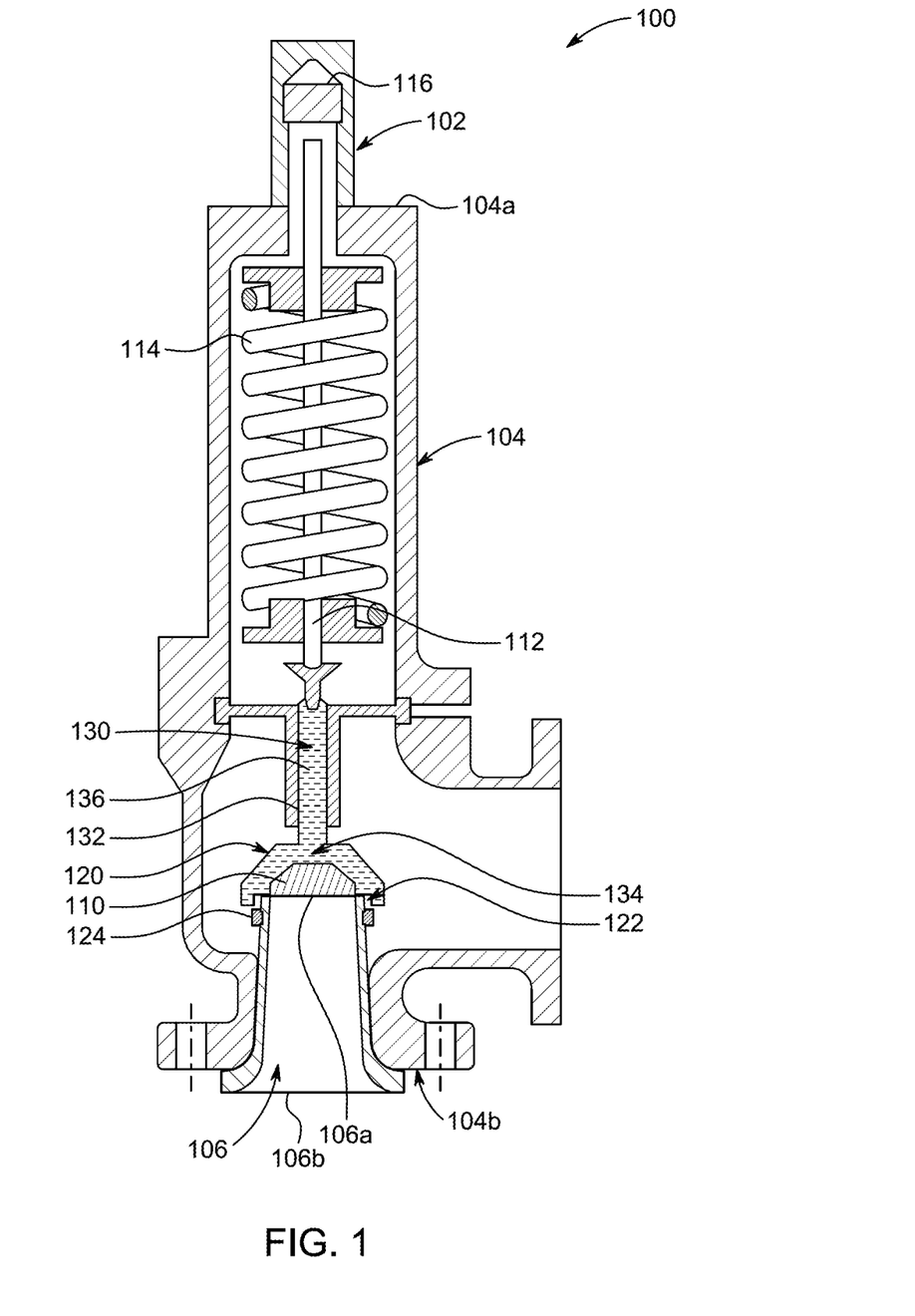
FIG. 1 is a diagrammatic cross-sectional view illustration of a relief valve device, according to certain embodiments.

Referring to FIG. 1, illustrated is a diagrammatic cross-sectional view of a relief valve device (represented by reference numeral 100); hereinafter, sometimes, simply referred to as "device 100" without any limitations. The relief valve device 100, as described herein, is a pressure relief valve which is a type of relief valve, or generally safety valve, used to control or limit the pressure in a pressurized fluid system (hereinafter, referred to as "system," not shown in drawings). Herein, the said system may be any of pneumatic and hydraulic systems which are used to control fluid variables, such as pressure, temperature and flow. The relief valve device 100 is used to respond to an overpressure event and avoid overpressure on an upstream side (high pressure side) of the relief valve in the system and thereby avoid damage to any upstream process, instrument or equipment failure. As used herein, the overpressure event may refer to any condition which may cause pressure in the system to increase beyond a specified design pressure. By use of the relief valve device 100, the pressure in the system is relieved by allowing the pressurized fluid to flow from an auxiliary passage out of the system. The relief valve device 100 is designed or set to open at a predetermined set pressure to protect pressure vessels and other equipment from being subjected to pressures that exceed their design limits. When the set pressure is exceeded, the relief valve device 100 opens to provide an auxiliary route for fluid escape or diversion thereby permitting at least a portion of the fluid to be diverted and provide pressure relief in the system. In some embodiments, the valve device 100 operates at a set pressure ranging from 20 pounds per square inch gauge (psig) to 2,500 psig, preferably 25 psig to 2,000 psig, preferably 30 psig to 1,500 psig, preferably 35 psig to 1,000 psig, preferably 35 psig to 500 psig, preferably 40 psig to 225 psig, preferably 50 psig to 200 psig, preferably 75 psig to 175 psig, preferably 100 psig to 150 psig, or 125 psig. In some embodiments, the valve device 100 operates between at least 1% and 30% above the set maximum operating pressure of the system, preferably 10% to 25%, preferably 15% to 20%, preferably 2% to 9%, preferably 3% to 8%, preferably 4% to 7%, or 5%.

As illustrated in FIG. 1, the relief valve device 100 includes a valve body 102. The valve body 102 provides a housing to support various elements of the relief valve device 100. The valve body 102, also referred to as valve shell, is the primary pressure boundary of the relief valve device 100. The valve body 102 serves as the principal element, providing the framework that holds the various elements of the relief valve device 100 together. For instance, the valve body 102 resists fluid pressure loads from connecting piping in the system, and receives inlet and outlet piping of the system through threaded, bolted, or welded joints. In one or more examples, the valve body 102 is made of metallic material, such as stainless steel, galvanized steel, iron, nickel, copper, aluminum, bronze, metal alloys, or the like. For present purposes, the valve body 102 may be casted or forged from the selected material into required shape, which is usually cylindrical or spherical. In some embodiments, the length of the forged valve body 102 is between 1.1 and 1.7 times greater than the length of an exhaust port or auxiliary passage, preferably 1.2 to 1.6 times greater, preferably 1.3 to 1.5 times greater, or 1.4 times greater. The length of the forged valve body 102 can be defined as the length between a top surface of an adjusting screw 116 to a nozzle 106. The length of the exhaust port can be defined as the length of the opening in FIG. 1 that is exposed to an external atmosphere.

Further, as illustrated, the valve body 102 provides a section in which different components responsible for releasing excessive pressure in the system are arranged, and such section is referred to as valve bonnet 104 (as shown in FIG. 1). It may be understood that the valve bonnet 104 is preferably a unitary part of the valve body 102; however, in other examples, the valve bonnet 104 may be a separately casted or forged from same or different material as that of the valve body 102, and is connected to the valve body 102 by a threaded, bolted, or welded joint. In some embodiments, the valve bonnet 104 is fabricated of brass, plastic, aluminum, steel, or the like. In some embodiments, the valve bonnet 104 is substantially cylindrical and has a diameter ranging from 2 inches to 8 inches, preferably 3 inches to 7 inches, preferably 4 inches to 6 inches, or 5 inches. The valve bonnet 104 has a top surface 104a and a bottom surface 104b. In some embodiments, the length between the top surface 104a and bottom surface 104b ranges from 2 inches (in) to 16 in, preferably 4 in to 14 in, preferably 6 in to 12 in, or 10 inches. Further, the relief valve device 100 includes a nozzle 106 disposed in the valve bonnet 104. Specifically, the nozzle 106 is disposed in the bottom surface 104b of the valve bonnet 104 and is fastened in the bonnet through a friction, threaded, bolted, or welded joint. The nozzle 106 has a top section 106a and a bottom section 106b. The nozzle 106 is designed to connect the relief valve device 100 to the piping or equipment of the system. The nozzle 106 may use different types of end connections, such as butt or socket welded, threaded or flanged for such connection purposes. In some embodiments, the nozzle 106 can accommodate pressurized gas in a range from 10 pounds per square inch/minute (psi/min) to 100 psi/min, preferably 20 psi/min to 90 psi/min, preferably 30 psi/min to 80 psi/min, preferably 40 psi/min to 70 psi/min, preferably 50 psi/min to 60 psi/min, or 55 psi/min. In some embodiments, the length between the top section 106a and the bottom section 106b ranges between 1 inch and 6 inches, preferably 2 inches to 5 inches, preferably 3 inches to 4 inches, or 3.5 inches. In alternate embodiments, the nozzle 106 takes on a conical shape, inverted shape, convergent shape, ring shape, flat-tipped shape, or divergent shape. In some embodiments, the bottom section 106b of the nozzle 106 is connected to a bottom surface 104b of the valve bonnet 104 and the top section of the nozzle 106a is connected to the valve disc 110.

The relief valve device 100 also includes a valve disc 110. The valve disc 110 is a pressure-retaining part which provides the capability for permitting and prohibiting fluid flow in the relief valve device 100, e.g., fluid flow from an upstream high pressure side to a low pressure downstream side. The valve disc 110 is typically forged and, in some designs, hard-surfaced to provide good wear characteristics. As shown in FIG. 1, in the relief valve device 100, the valve disc 110 lies and is positioned above the nozzle 106 at the top section 106a and seals the downstream nozzle from the upstream portion of the valve. In one or more examples, the valve bonnet 104 may provide a seat or seal rings (not shown) to provide a seating surface for the valve disc 110. In a configuration, the valve bonnet 104 is machined to serve as the seating surface and seal rings are not used. In another configuration, forged seal rings are threaded or welded to the valve bonnet 104 to provide the seating surface. In some embodiments, the valve disc 110 is forged of aluminum, steel, plastic, polymers, bronze, iron, nickel, or copper. In some embodiments, the length of the valve disc 110 is between 0.5 times to 0.8 times as great as the length of the valve bonnet 104, preferably 0.55 to 0.75 times as great, preferably 0.6 to 0.7 times as great, or 0.65 times as great. In some embodiments, the valve disc 110 includes a recess sized between 0.25 inches and 1 inch in depth to form a connection with the valve bonnet 104, preferably between 0.3 in to 0.9 in, preferably 0.4 in to 0.8 in, preferably 0.5 in to 0.7 in, or 0.6 in in depth. The relief valve device 100 further includes a valve stem 112 which is responsible for the proper positioning of the valve disc 110 in the valve bonnet 104. The valve stem 112 also provides the necessary movement to the valve disc 110 for opening or closing of the relief valve device 100. The valve stem 112 is typically forged separately, and is connected to the valve disc 110 by threaded or welded joints. In some embodiments, the valve stem 112 is forged of metal, plastic, ceramic, or a combination of the like. In some embodiments, the valve stem 112 has a length that is between 0.4 and 0.8 times the length between the top surface 104a and the bottom surface 104b, preferably 0.45 to 0.75 times the length, preferably 0.5 to 0.7 times the length, preferably 0.55 to 0.65 times the length, or 0.6 times the length. In some embodiments, the valve stem 112 is substantially cylindrical and has a radius ranging from 0.2 inches to 0.6 inches, preferably 0.25 in to 0.55 in, preferably 0.3 in to 0.5 in, preferably 0.35 in to 0.45 in, or 0.4 inches in diameter.

According to embodiments of the present disclosure, as also shown in FIG. 1, the relief valve device 100 is a spring-loaded pressure relief valve. In such embodiments, the relief valve device 100 includes a spring 114. In the illustrated example, the spring 114 is a helical spring; however, in other examples, the spring 114 may be use other type of compression springs, or even a diaphragm in some cases, without any limitations. In the relief valve device 100, the spring 114 is selected to fit inside the valve bonnet 104. As shown in FIG. 1, the spring 114 is disposed in the valve bonnet 104. Further, as shown, the spring 114 surrounds a periphery of the valve stem 112, such that the longitudinal axis of the spring 114 and longitudinal axis valve stem 112 are coaxial within the bonnet 104. In the relief valve device 100, the spring 114 is selected/designed for a set pressure of the relief valve device 100; i.e., to have a predetermined force of the spring. In some embodiments, the spring 114 is fabricated of a metal. In some embodiments, the spring 114 can stretch between 0.3 to 0.7 times the length of the valve bonnet 104, preferably 0.35 to 0.65 times the length, preferably 0.4 to 0.6 times the length, preferably 0.45 to 0.55 times the length, or 0.5 times the length. The spring force at least partially defines the set-pressure threshold, which is the minimum pressure at the nozzle 106 required to overcome the spring force and move the valve disc 110 out of sealing engagement with the nozzle 106. In some embodiments, the relief valve device 100 also includes a pressure adjusting screw 116. The pressure adjusting screw 116 is configured to control the predetermined force of the spring 114. This may be achieved by tightening or loosening the pressure adjusting screw 116, as may be understood by a person skilled in the art. As shown, the pressure adjusting screw 116 is configured above the top surface 104a of the valve bonnet 104. Such arrangement provides access to the pressure adjusting screw 116 from outside of the valve bonnet 104, to allow for its adjustment as required. In some embodiments, the pressure adjusting screw 116 is forged of metal, metal alloys, plastics, or a combination of the like. In some embodiments, the pressure adjusting screw 116 is welded or molded to the valve bonnet 104 itself. In some embodiments, the pressure adjusting screw 116 is substantially cylindrical and has a diameter ranging from 0.1 to 0.4 times the diameter of the valve bonnet 104, preferably 0.15 to 0.35 times the diameter, preferably 0.2 to 0.3 times the diameter, or 0.25 times the diameter.

Such design of the relief valve device 100 helps the spring 114 to be implemented for opening and closing of the relief valve device 100. Herein, the relief valve device 100 is configured such that flow through the nozzle 106 is prevented when a first pressure at an inlet of the nozzle 106 is below the predetermined force of the spring 114; and when the first pressure exceeds the predetermined force of the spring 114, the valve stem 112 is moved linearly through an axis of the spring 114 to displace the valve disc 110 from its position atop the nozzle 106 and permit flow from the valve body through the nozzle 106. In some embodiments, the valve stem 112 can move linearly from 0.6 to 0.8 times the length between the top surface 104a and bottom surface 104b, preferably 0.625 to 0.775 times the length, preferably 0.65 to 0.75 times the length, preferably 0.675 to 0.725 times the length, or 0.7 times the length. In some examples, the relief valve device 100 further includes a bonnet plug (not shown) disposed within the valve bonnet 104 at a side surface of the valve bonnet 104. The bonnet plug helps to keep the pressure inside the valve bonnet 104 to be almost equal to atmospheric pressure at all times. Thus, the bonnet plug prevents flow through the nozzle 106 when the first pressure at the inlet of the nozzle 106 is below the predetermined force of the spring 114.

In the present embodiments, the relief valve device 100 further includes a disc holder 120 which may be a distinct component separable from the valve disc 110 or integrated with the valve disc. In some embodiment the valve disc is a seating surface of the disc holder that seals the valve body from the nozzle and prevents fluid from leaving the valve body. The disc holder 120 is preferably designed to allow the valve disc 110 to float which provides play for an angular movement that reduces seat leakage from minor misalignments (ensuring that the valve disc 110 has 360 degrees of contact with the seat provided on the nozzle 106).

As shown in FIG. 1, in the relief valve device 100, the disc holder 120 surrounds an outer periphery of the valve disc 110 and makes direct contact with a surface of the valve disc 110 around an entire perimeter of the valve disc 110. In the present examples, the disc holder 120 is made of a metal. In other examples, the disc holder 120 is made of plastic, ceramic, polymers, or metal alloys. Generally, the disc holder 120 may be made of same material as the valve disc 110. In an example, the disc holder 120, similar to the valve disc 110, may also be forged and, in some configurations, hard-surfaced to provide good wear characteristics. In some examples the lateral length of the disc holder 120 is 1.1 to 1.4 times the length of the valve disc 110, preferably 1.15 to 1.35 times the length, preferably 1.2 to 1.3 times the length, or 1.25 times the length. In alternate embodiments, the disc holder 120 contains an adjustment ring to tightly seal the valve disc 110 to the disc holder 120 and is preferably made of a plastic or polymer.

The relief valve device 100 also includes a huddling chamber 122. The huddling chamber 122 is around the periphery of the nozzle 106, that aids in the relief valve in providing a snap opening. If a huddling chamber is too large, it can cause a blow-down value of a relief valve to be higher than desired. Thus, it may be desirable to scale the huddling chamber so that the valve snaps open, e.g., opens with the aid of force imparted or enhanced by the huddling chamber, but maintains a low blow down value. The disc holder 120, a blowdown ring 124, and outer wall of nozzle 106 are configured to provide the huddling chamber 122. The huddling chamber is a space that is preferably defined by surfaces of the disc holder, the nozzle and the blowdown ring. As shown in FIG. 1, the huddling chamber is defined by bottom surfaces of the disc holder having both vertical and horizontal components, a top surface of the blowdown ring and a portion of a side surface of the nozzle. The huddling chamber preferably extends around the entire circumference of an outer surface of the nozzle in the form of a ring. Preferably, a portion of a side wall of the huddling chamber is at least partially open although in other embodiments openings may be provided by gaps in the blowdown ring. The huddling chamber 122 is a space in which a fluid gathers; specifically, an annular space under a projecting collar of the valve disc 110, in which the fluid collects as soon as the relief valve device 100 opens. During operation of the relief valve device 100, the fluid in the huddling chamber 122 preferably exerts force on the valve disc 110, forcing the relief valve device 100 to open wider and to hold the relief valve device 100 open until the pressure on the upstream side of the valve drops. It may be appreciated that an outside diameter, shape and thickness of the disc holder 120 plays a role in defining the shape of the huddling chamber 122, and thereby the initial lift and the performance of the relief valve device 100. In some embodiments, the huddling chamber 122 contains a volume of fluid ranging from 0.1 mL to 250 mL, preferably 25 mL to 225 mL, preferably 50 mL to 200 mL, preferably 75 mL to 175 mL, preferably 100 mL to 150 mL, or 125 mL of fluid. In some embodiments, the valve disc 110 is hollow and its volume is filled with an oil. In some embodiments, the hollow section of the valve disc 110 may be continuous with a hollow portion of the valve stem 112 so that there is a continuous volume between the two components. In some embodiments, the hollow section of the valve disc 110 may not be continuous with a hollow portion of the valve stem 112 so that there is a physical barrier between the two components, separating two distinct volumes.

The relief valve device 100 further includes a blowdown ring 124. In the relief valve device 100, as shown in FIG. 1, the blowdown ring 124 is disposed at the top section 106a of the nozzle 106. The blowdown ring 124 is an adjustable ring with a design shape that modifies the effluent flow path. It may be appreciated that the shape of the huddling chamber 122 may also be defined based on the size of the blowdown ring 124. In the relief valve device 100, as shown in FIG. 1, the blowdown ring 124 is threaded onto the nozzle 106. In particular, the blowdown ring 124 is disposed at a top section 106a of the nozzle 106. The blowdown ring 124 may be adjusted vertically up or down to a position relative to contact with the valve disc 110. The position of the blowdown ring 124 may change the blowdown (or reseat) pressure; and the closer the blowdown ring 124 is to the nozzle 106, the lower the pressure in the system will need to be for the relief valve device 100 to close (more blowdown). The position of the blowdown ring 124 in the valve bonnet 104 is fixed with a locking screw (not shown). In the relief valve device 100, the blowdown ring 124 may also be swapped to different size or different shaped rings to adjust performance based on the expected relief fluid. In some embodiments, the blowdown ring 124 has a length from 0.1 to 0.4 times the length of the valve disc 110, preferably 0.15 to 0.35 times the length, preferably 0.2 to 0.3 times the length, or 0.25 times the length. In some embodiments, the blowdown ring 124 is shaped of plastic or metal. In some embodiments, the blowdown ring is spaced away from top surface 106a of the valve disc 110 from between 0.05 inches or 0.3 inches, preferably 0.1 inches to 0.25 inches, or 0.175 inches.

It may be appreciated that the relief valve device 100 is generally modular. The internal parts for the relief valve device 100, including the valve disc 110, the disc holder 120, the blowdown ring 124 may be interchanged for ones with a different design to customize performance of the relief valve device 100 based on the application, fluid service, and set pressure. In general, the shape of the huddling chamber 122 (created by the shape and size of the disc holder 120), the position and shape of the blowdown ring 124, and the characteristics of the fluid being relieved together determine the initial opening force and the initial lift of the relief valve device 100. The relief valve device 100 may have a "pop action" as it typically pops open at a preset pressure. The pop action occurs because the huddling chamber 122 is designed with an area that is approximately 10%-30% larger than the valve seat (as the disc holder 120 is bigger than the valve disc 110), preferably 12%-28%, preferably 14%-26%, preferably 16%-24%, preferably 18%-22%, or 20%. Once the pressure under the seat is enough to lift the valve disc 110 off the nozzle 106, there is a step change in the upward force on the spring 114 and the relief valve device 100 pops open. Such sudden pop may cause vibration and consequently mechanical waves to propagate in the valve body 102, which, in turn, may affect seating of the valve disc 110 with respect to the nozzle 106.

In the present embodiments, the disc holder 120 has a stem portion 130, preferably continuous or in mechanical communication with the valve stem 112. As shown in FIG. 1, the stem portion 130 is extending upwards in the valve bonnet 104, from the valve disc 110. In particular, the stem portion 130 has a stem section 132 and a base section 134. In an embodiment, the stem section 132 is a cylindrical stem section, with the two terms being interchangeably used hereinafter. That said, in other examples, the stem section 132 may have any other suitable shape, such as cylindrical cross-section, without any limitations. In some embodiments, the stem section 132 has a diameter that is between 1.1 and 1.3 times the diameter of the pressure adjusting screw 116, preferably 1.15 to 1.25 times greater, or 1.2 times greater. In some embodiments, the stem section 132 is forged of metal, plastic, or ceramic. In some embodiments, the stem section has a length that is 0.3 to 0.6 times the length between 104a and 104b of the valve bonnet 104, preferably 0.35 to 0.55 times greater, preferably 0.4 to 0.5 times greater, or 0.45 times greater. Further, in an embodiment, the base section 134 may be a cylindrical base section. That said, in other examples, the base section 134 may have any other suitable shape, such as circular cross-section, without any limitations. In the relief valve device 100, as shown, the base section 134 sits atop the valve disc 110. Further, the cylindrical stem section 132 extends upwards from the cylindrical base section 134, forming the disc holder 120. In an example, a diameter of the cylindrical stem section 132 is from 0.1 to 0.3 times a length of the cylindrical base section 134, preferably 0.125 to 0.275 times a length, preferably 0.15 to 0.25 times a length, preferably 0.175 to 0.225 times a length, or 0.2 times a length. For instance, in a particular example, as may be seen from FIG. 1, the diameter of the cylindrical stem section 132 is 0.7 times the length of the cylindrical base section 134. In some embodiments, the cylindrical base section 134 is made of metal, plastic, ceramic, or a combination of the like.

According to preferable embodiments of the present disclosure, the disc holder 120 may be at least partially hollow and filled with oil (as represented by reference numeral 136 in FIG. 1). In an embodiment, the disc holder 120 has a hollow cylindrical stem section 132, and the oil 136 is present in the cylindrical stem section 132 of the disc holder 120. In an embodiment, the disc holder 120 has a hollow cylindrical stem section 132 and a hollow base section 134. Further, the hollow cylindrical stem section 132 and the hollow base section 134 define a continuous space, and both the hollow cylindrical stem section 132 and the hollow cylindrical base section 134 are filled with the oil 136. In some embodiments, the total volume of the stem section 132 with the valve disc 110 is between 1.2 and 2 times greater than the total volume of the hollow space in the base section 134, preferably 1.3 to 1.9 times greater, preferably 1.4 to 1.8 times greater, preferably 1.5 to 1.7 times greater, or 1.6 times greater. For purposes of the present disclosure, the oil 136 used to fill the disc holder 120 is a heavy oil, for example, but not limited to, mineral oil, polyalphaolefin, organophosphate ester and the like. Noncombustible inorganic oils are preferable for applications involving flammable fluids, e.g., silicon oils. In some embodiments, the oil 136 has a density from 800 kg/m$^3$ to 1400 kg/m$^3$, preferably 900 kg/m$^3$ to 1300 kg/m$^3$, preferably 1000 kg/m$^3$ to 1200 kg/m3, or 1100 kg/m$^3$. In some embodiments, the oil 136 occupies between 60% and 100% of the volume within the cylindrical stem section, preferably 65% to 95%, preferably 70% to 90%, preferably 75% to 85%, or 80%. In some embodiments, the oil 136 has a dynamic viscosity ranging from 10 MPa-s to 50 MPa-s, preferably 20 MPa-s to 40 MPa-s, or 30 MPa-s. In some embodiments, the oil 136 has a specific gravity of from 0.82 to 0.94, preferably 0.84 to 0.92, preferably 0.86 to 0.9, or 0.88. In some embodiments, the cylindrical stem section 132 is hollow along from 50% to 90% of an entire length of the cylindrical stem section 132, preferably between 60% and 80%, or 70%. The oil preferably has a viscosity of 40-150 cSt at 40 C, preferably 60-120 cSt or preferably 80-100 cSt. It may be appreciated by a person skilled in the art that the heavy oil is used as these are highly incompressible and may thus be better suited for providing the dampening effect in the relief valve device 100.

In the relief valve device 100, when the valve disc 110 may be subjected to vibration due to push from release of excessive pressure of the fluid from the nozzle 106, the oil 136 in the disc holder 120 may help to dampen such vibrations, thus minimizing propagation of mechanical vibrations in the relief valve device 100 and preventing risk of the valve disc 110 being displaced and not being properly seated onto the nozzle 106. Further, the proposed design with the oil 136 being present in both the hollow cylindrical stem section 132 and the hollow cylindrical base section 134 may provide enhanced dampening effect for vibrations in the valve disc 110. Further, in some embodiments, the valve stem 112 is fluidly connected to the disc holder 120. In such case, the oil 136 from the disc holder 120 may also be passed to the valve stem 112. The valve stem 112 is in direct or indirect mechanical connection with the valve disc 110 and with the oil 136 present therein, may provide a relatively enhanced dampening effect for vibrations in the valve disc 110.

Figure 2:
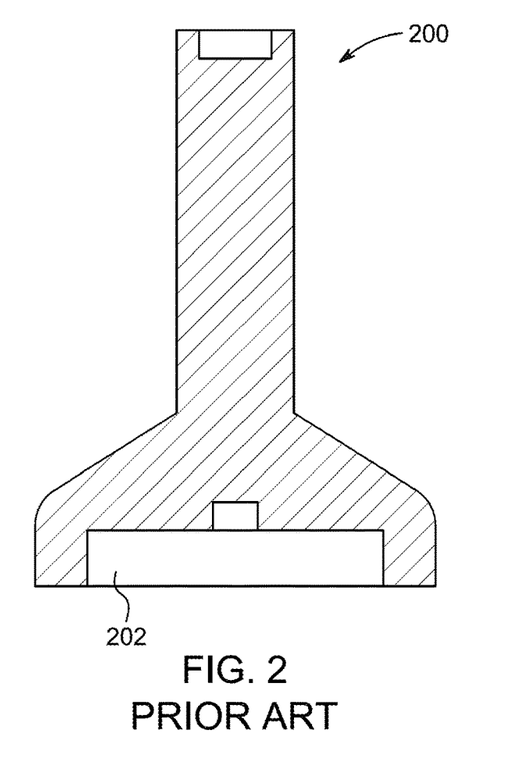
FIG. 2 is a simplified diagrammatic cross-sectional view illustration of a pressure relief valve.
Figure 3:
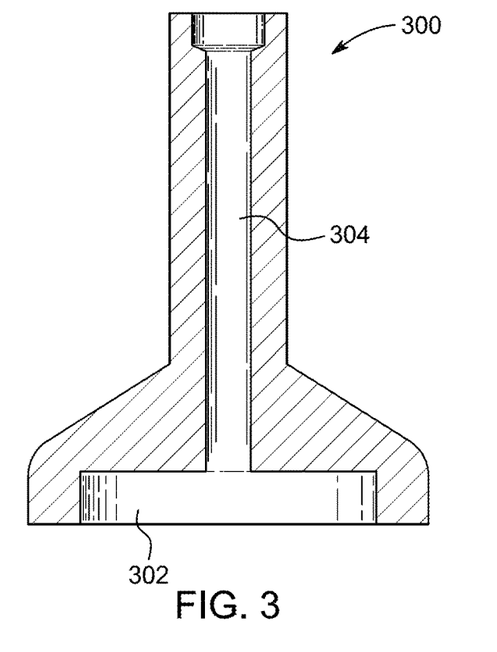
FIG. 3 is a simplified diagrammatic cross-sectional view illustration of the relief valve device of FIG. 1, according to certain embodiments.

Referring to FIG. 2, illustrated is a simplified diagrammatic cross-sectional view of a disc holder and stem section (as represented by reference numeral 200) with a valve disc 202. As shown, the design of the disc holder and stem section 200 does not provide any section which may be filled with a fluid (such as, oil) to enable dampening of generated vibrations in the valve disc 202 therein. Referring to FIG. 3, illustrated is a simplified diagrammatic cross-sectional view of a disc holder and stem section (as represented by reference numeral 300, and is similar in design to the disc holder 120 and stem section 132 of FIG. 1) with a valve disc 302, according to certain embodiments of the present disclosure. As shown, the design of the disc holder and stem section 300 provide a disc holder 304 supporting the valve disc 302. The disc holder 304 is hollow to allow to its empty volume be filled with a fluid (such as, the oil 136) to enable dampening of generated vibrations in the valve disc 302 therein.

Figure 4:
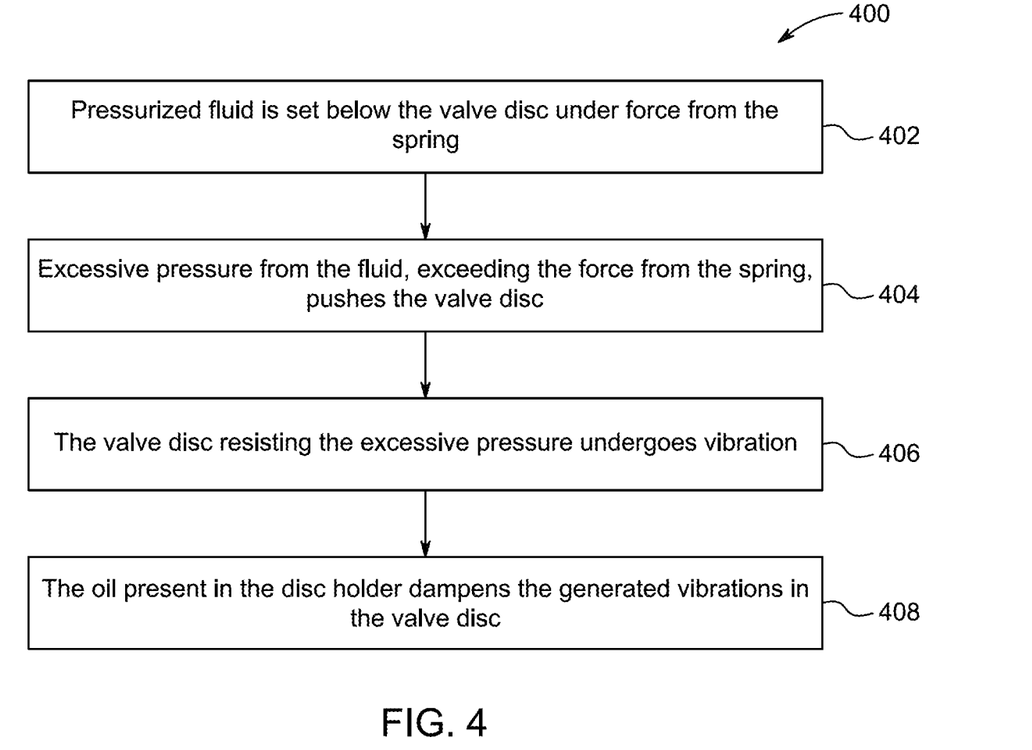
FIG. 4 is an exemplary flowchart listing steps involved in operation of the relief valve device of FIG. 1, according to certain embodiments.

FIG. 4 is an exemplary flowchart 400 listing steps involved in operation of the relief valve device 100 of FIG. 1, according to certain embodiments. Herein, the steps of the flowchart 400 of FIG. 4 have been explained with reference to described elements in the preceding paragraphs. Initially, a pressurized fluid is set below the valve disc 110 under force from the spring 114, as described in step 402. The pressurized fluid may build up below the valve disc 110 to exceed the predetermined force of the spring 114. In some embodiments, the fluid builds up to at most 105% to 115% of the predetermined force of the spring, preferably 106% to 114%, preferably 107% to 113%, preferably 108% to 112%, preferably 109% to 111%, or 110%. The excessive pressure from the fluid, exceeding the predetermined force of the spring 114, may push the valve disc 110 to cause the relief valve device 100 to open, as described in step 404. The force due to the excessive pressure may be resisted by the valve disc 110 resulting in the valve disc 110 undergoing vibration (also known as valve chatter), as described in step 406. At step 408, the relief valve device 100 with the oil 136 present in the disc holder 120 dampens the generated vibrations in the valve disc 110 as explained in the preceding paragraphs. In particular, because of the pop action of the valve disc 110, the oil 136 may move upwards in the disc holder 120 to absorb vibrations, and in turn may cause faster and proper seating of the valve disc 110 back on to the nozzle 106 when the excessive pressure is released.

Thus, the design of the relief valve device 100 of the present disclosure may help to overcome the instability issues due to vibrations in the pressure relief valves during release of excessive pressure therefrom, and thereby prevent possible mechanical failures, such as improper seating of the valve disc due to displacement thereof with respect to the nozzle by augmenting damping effect via use of oil in the disc holder 120. The relief valve device 100 of the present disclosure with the above described features may particularly be useful in high pressure applications, such as gas industry (like hydrocarbon gases), HVAC industry, aerospace industry, and the like. In an embodiment, the relief valve device 100 may include a process zone valve (PZV). In other words, the relief valve device 100 is a process zone valve (PZV) which is widely used in the gas industry. The PZV directs the oil 136 to flow through the disc holder 120 to minimize vibrations, and cause faster and proper seating of the valve disc 110 back onto the nozzle 106 when the excessive pressure is released. This may reduce loss of the gases from the PZV valve and thus help in reducing the amount of burning of lost (exhausted) gases in the flare, saving the product from wastage at the same time, and further reducing the amount of pollution from the gases that may otherwise be burned. In some embodiments, the PZV is sized so the operating pressure does not exceed at most 10% of set valve pressure. In some embodiments, the PZV is fabricated of metal or plastic. In some embodiments, the PZV can direct flows ranging from 10 pounds per square inch/minute (psi/min) to 100 psi/min, preferably 20 psi/min to 90 psi/min, preferably 30 psi/min to 80 psi/min, preferably 40 psi/min to 70 psi/min, preferably 50 psi/min to 60 psi/min, or 55 psi/min.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A hollow stem relief valve device, comprising:
a spring;
a valve bonnet;
a valve stem;
a disc holder;
a valve disc;
a huddling chamber;
a blowdown ring;
a nozzle;
the valve disc is positioned above the nozzle;
the spring is disposed in the valve bonnet;
the spring surrounds the valve stem such that a longitudinal axis of the spring and a longitudinal axis of the valve stem are coaxial;
the disc holder surrounds an outer periphery of the valve disc and is adjacent and in direct contact with a surface of the valve disc around an entire perimeter of the valve disc;
the blowdown ring is disposed at a top section of the nozzle;
a bottom section of the nozzle is connected to a bottom surface of a valve body and the top section of the nozzle is connected to the valve disc;
the disc holder is filled with oil;
wherein the relief valve device is configured such that flow through the nozzle is prevented when a first pressure at an inlet of the nozzle is below a predetermined force of the spring, and when the first pressure exceeds the predetermined force of the spring, the valve stem is moved linearly through an axis of the spring to displace the valve disc from sitting atop the nozzle and permit flow through the nozzle;
wherein the disc holder has a hollow cylindrical stem section and a hollow base section;
wherein the hollow cylindrical stem section and the hollow base section define a continuous space; and
wherein both the hollow cylindrical stem section and the hollow base section are filled with the oil and the total volume of the cylindrical stem section with the valve disc is between 1.2 and 2 times greater than the total volume of the continuous space.

2. The relief valve device of claim 1, wherein the hollow base section of the disc holder is a cylindrical base section.

3. The relief valve device of claim 2, wherein a diameter of the cylindrical stem section is from 0.6 to 0.8 times a length of the cylindrical base section.

4. The relief valve device of claim 2, wherein the cylindrical base section sits atop the valve disc.

5. The relief valve device of claim 1, wherein the cylindrical stem section is hollow along from 50% to 90% of an entire length of the cylindrical stem section.

6. The relief valve device of claim 1, wherein the disc holder is made of a metal.

7. The relief valve device of claim 1, wherein the disc holder, the blowdown ring, and an outer wall of the nozzle define the huddling chamber.

8. The relief valve device of claim 1, wherein the device further comprises a pressure adjusting screw configured above a top surface of the valve bonnet.

9. The relief valve device of claim 8, wherein the pressure adjusting screw is configured to control the predetermined force of the spring.

10. The relief valve device of claim 1, wherein the valve stem is fluidically connected to the disc holder.

* * * * *